(12) United States Patent
Wei et al.

(10) Patent No.: US 8,838,016 B2
(45) Date of Patent: Sep. 16, 2014

(54) COMPUTER-AIDED LEARNING SYSTEM AND METHOD WITH ADAPTIVE OPTIMIZATION

(75) Inventors: Haiqing Wei, San Jose, CA (US); Gang Huang, Beijing (CN); Juhua Mao, Beijing (CN)

(73) Assignee: Beijing Ambow Online Software Co., Ltd., Beijing (CN)

( * ) Notice: Subject to any disclaimer, the term of this patent is extended or adjusted under 35 U.S.C. 154(b) by 530 days.

(21) Appl. No.: 12/953,724

(22) Filed: Nov. 24, 2010

(65) Prior Publication Data

US 2011/0281253 A1    Nov. 17, 2011

Related U.S. Application Data

(60) Provisional application No. 61/333,391, filed on May 11, 2010.

(51) Int. Cl.
*G09B 3/00* (2006.01)
*G09B 7/00* (2006.01)

(52) U.S. Cl.
CPC ........................................ *G09B 7/00* (2013.01)
USPC ........................................................ 434/350

(58) Field of Classification Search
USPC .......... 434/118, 322, 323, 350–352, 360–362
See application file for complete search history.

(56) References Cited

U.S. PATENT DOCUMENTS

| | | | |
|---|---|---|---|
| 6,353,447 B1 * | 3/2002 | Truluck et al. | 715/733 |
| 6,419,496 B1 * | 7/2002 | Vaughan, Jr. | 434/322 |
| 6,937,842 B2 * | 8/2005 | Uchimura et al. | 434/350 |
| 8,113,842 B2 * | 2/2012 | Stone | 434/178 |
| 2004/0166483 A1 * | 8/2004 | Wen et al. | 434/323 |
| 2005/0277099 A1 * | 12/2005 | Van Schaack et al. | 434/322 |
| 2007/0298385 A1 * | 12/2007 | Jenkins et al. | 434/156 |
| 2008/0261191 A1 * | 10/2008 | Woolf et al. | 434/323 |

* cited by examiner

*Primary Examiner* — Robert J Utama
*Assistant Examiner* — Sadaruz Zaman
(74) *Attorney, Agent, or Firm* — Suiter Swantz pc llo

(57) ABSTRACT

A computer-aided learning system with adaptive optimization is disclosed. The system may comprise a storage module configured for storing learning data; a man-machine interface configured for providing the learning data to at least one learner; an information collection module configured for tracking and recording an interactive learning process; a learning process analysis module configured for receiving the interactional learning process provided by the information collection module, the learning process analysis module further configured for analyzing the interactional learning process and forming a control signal; and a learning strategy generation module configured for receiving the control signal from the learning process analysis module, the learning strategy generation module further configured for generating a learning strategy signal based on the control signal; wherein the man-machine interface is configured to provide the learning data to the at least one learner based on the learning strategy signal.

6 Claims, 2 Drawing Sheets

COMPUTER-AIDED LEARNING SYSTEM AND METHOD WITH ADAPTIVE OPTIMIZATION

CROSS-REFERENCE TO RELATED APPLICATIONS

The present application claims the benefit under 35 U.S.C. §119(e) of U.S. Provisional Application Ser. No. 61/333,391, filed May 11, 2010. Said U.S. Provisional Application Ser. No. 61/333,391 is hereby incorporated by reference in its entirety.

TECHNICAL FIELD

The present invention relates to the field of computer application and particularly to a computer-aided learning system and method with adaptive optimization.

BACKGROUND

Memory retention decays in time monotonically, if the memorized information is not reviewed or recalled and used in subsequent mental activities. The well-known spacing effect posits that temporally spaced presentations and reviews yield substantially better learning results and efficiency than massed presentations and iterations do.

With the development of computer technology, now various computer-aided learning system and method with adaptive optimization have appeared, if better understood and employed the spacing effect, it could significantly benefit learning processes in classroom or computer-aided instructions. The existing computer-aided learning systems and methods with adaptive optimization are mostly utilized the characteristic of mass storage capacity and high interaction, attracting learners by multimedia, and the spacing effect is far from widespread and systematic. Even in the touted spacing-effect applications, the adopted strategy of spaced presentations or reviews is mostly qualitative in nature and based on certain empirical data from experiments that are of questionable relevance to the concerned learning practices. Often enough, such strategies are not personalized, but rather of the "one size fits all" kind, that neglect any difference between individual learners.

When a grey-box model (also known as semi-physical model) is available based on insights into the system, induction of experimental observations, or general considerations of symmetry and conservation laws, the concerned dynamics is represented by predetermined mathematical formulas or transformations, with unknown parameters to be determined by stochastic filtering. Such mode is known as parametric system identification. By contrast, nonparametric system identification works with a black-box model when no mathematical formula or transformation is known or considered suitable for the system of interest. Nevertheless, mathematics is still indispensable to proceed quantitatively. For such nonparametric system identification applications, the mostly employed mathematical models and utilities include the Volterra or Wiener expansions. Unfortunately, for the dynamics of learning and forgetting, no semi-physical model has been conceived that is generally applicable and widely accepted, whereas nonparametric models may have to involve a large number of unknown degrees of freedom, that are difficult to determine within reasonable accuracy from a limited amount of observation data. Even though it proves hard to frame the dynamics of learning and forgetting into a mathematical model, either grey-box or black-box, there may be little doubt that the process of learning and forgetting is governed by deterministic principles or rules, albeit not visible to us, judging from the excellent reproducibility of many effects and phenomena concerning human memory.

SUMMARY

The present invention is directed to a computer-aided learning system with adaptive optimization. The system may comprise a storage module configured for storing learning data; a man-machine interface configured for providing the learning data to at least one learner; an information collection module configured for tracking and recording an interactive learning process, the interactive learning process representing a plurality of interactions between the at least one learner and the man-machine interface; a learning process analysis module configured for receiving the interactional learning process provided by the information collection module, the learning process analysis module further configured for analyzing the interactional learning process and forming a control signal; a learning strategy generation module configured for receiving the control signal from the learning process analysis module, the learning strategy generation module further configured for generating a learning strategy signal based on the control signal, the learning strategy signal being at least one of: a recommended daily learning duration for the at least one learner, a recommended time allocation for learning a new item, a recommended time allocation for reviewing an old item, a recommended number of new items to be learned in a day, a recommended time interval between two review sessions, and a recommended number of old items to be reviewed in a day; wherein the man-machine interface is configured to provide the learning data to the at least one learner based on the learning strategy signal.

A further embodiment of the present disclosure is directed to a method for computer-aided learning with adaptive optimization. The method may comprise reading learning data from a storage module; providing the learning data to at least one learner via a man-machine interface; tracking and recording an interactive learning process, the interactive learning process representing a plurality of interactions between the at least one learner and the man-machine interface; analyzing the interactional learning process and forming a control signal; generating a learning strategy signal based on the control signal, the learning strategy signal being at least one of: a recommended daily learning duration for the at least one learner, a recommended time allocation for learning a new item, a recommended time allocation for reviewing an old item, a recommended number of new items to be learned in a day, a recommended time interval between two review sessions, and a recommended number of old items to be reviewed in a day; and subsequently providing the learning data to the at least one learner based on the learning strategy signal via the man-machine interface.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principle of the disclosure.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the subject matter disclosed, which is illustrated in the accompanying drawings.

For optimizing practical instructions and learning strategies, it is essential to understand the dynamics of learning and forgetting, especially the interaction between spaced assessments or reviews and existing memories and the learning history, at least in the statistics sense. To that end, it is clear that the applicability of fixed learning and reviewing schedules as being empirically extracted from controlled but not necessarily relevant experiments is not unquestionable, let alone their optimality. None of the existing grey-box or black-box methods of system modeling and identification seems to be conveniently suitable for the purpose, especially when the model should be personalized to befit the particular traits and habits of individual learners.

Therefore, a systematic dynamical model may be appreciated. The systematic dynamical model may be system-identified via stochastic filtering using collected measurements or observations of either a designed experiment or a natural process of learning. The present invention is directed to a computer-aided learning system and method with adaptive optimization.

Figure 1:
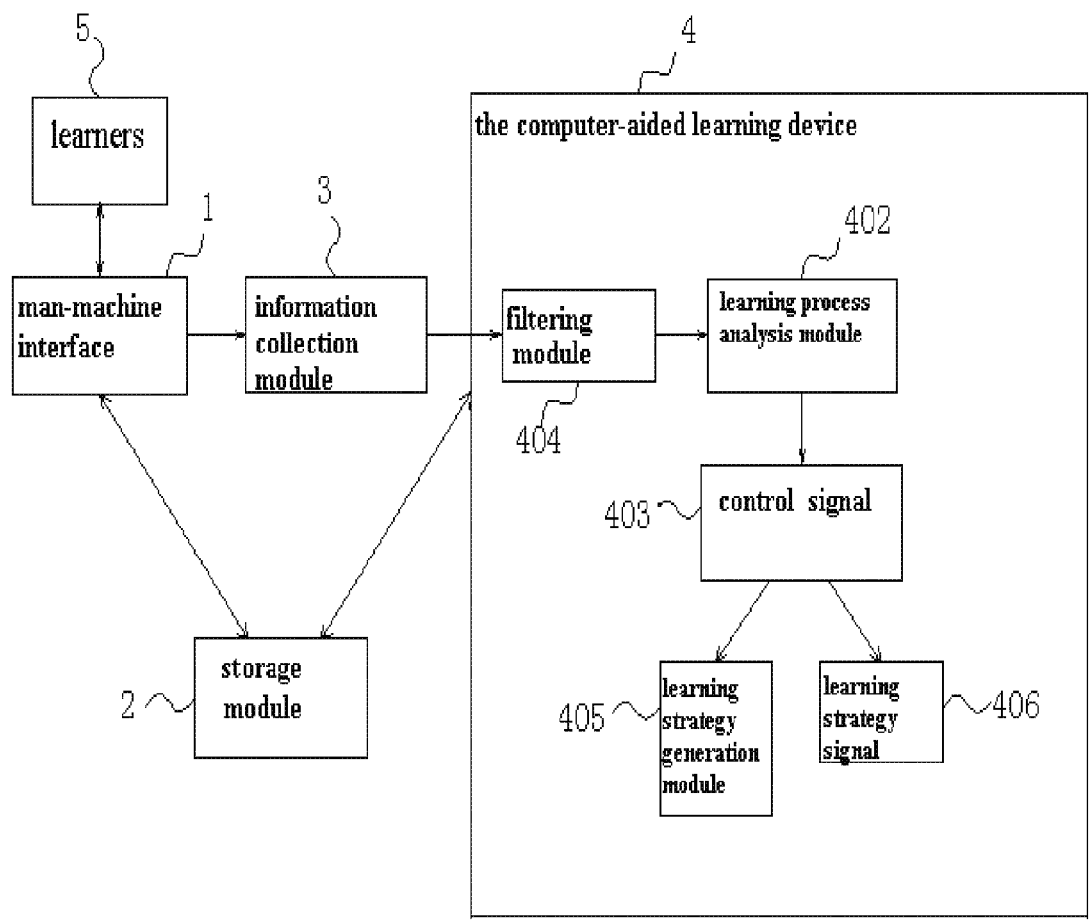
FIG. 1 is a frame of the computer-aided learning system with adaptive optimization of the present invention.

As shown in FIG. 1, a computer-aided learning system with adaptive optimization, comprising a storage module 2 configured for storing learning data; a man-machine interface 1 configured for providing the learning data to at least one learner; an information collection module 3 configured for tracking and recording an interactive learning process, the interactive learning process representing a plurality of interactions between the at least one learner and the man-machine interface 1; a learning process analysis module 402 configured for receiving the interactional learning process provided by the information collection module 3, the learning process analysis module 402 further configured for analyzing the interactional learning process and forming a control signal 403; a learning strategy generation module 405 configured for receiving the control signal 403 from the learning process analysis module 402, the learning strategy generation module 405 further configured for generating a learning strategy signal 406 based on the control signal 403, the learning strategy signal 406 being at least one of: a recommended daily learning duration for the at least one learner, a recommended time allocation for learning a new item, a recommended time allocation for reviewing an old item, a recommended number of new items to be learned in a day, a recommended time interval between two review sessions, and a recommended number of old items to be reviewed in a day; wherein the man-machine interface 1 is configured to provide the learning data to the at least one learner based on the learning strategy signal 406.

The computer-aided learning system with adaptive optimization further comprising a filtering module 404 configured for filtering learning strategy signals 406 generated by the learning strategy generation module 405, where the learning strategy signals are filtered based on an age associated with each learning strategy signal 406.

The learning strategy generation module 405 configured for generating a learning strategy signal 406 based on the control signal 403, the learning strategy signal 406 being at least one of: a recommended daily learning duration for the at least one learner $M_1$, a recommended time interval between two review sessions $\{T_i\}_{i=1}^{m}$, and $y_0=pM_1$ denotes learning efficiency, and the learning strategy module 405 of learning efficiency maximization subjects to the equation, that is, $$M_1 = \frac{C_{tot}}{C_0 + \sum_{i=1}^{m} C_i}$$

where the recommended daily learning duration for the at least one learner $M_1$ is a raw learning rate, $C_{tot}$ is the time resource bound, $C_0$ is the time cost constant, and $\{C_i\}_{i=1}^{m}$ is the other time cost constants. Consequently, an inner loop needs just to maximize the learning efficacy $p(T_1, T_2, \ldots T_m)$, subject to the following constraints, $$T_i > 0, \forall i \in [1, m], \sum_{i=1}^{m} T_i \leq T_{max}$$

Wherein $T_{max}$ is a predetermined upper bound.

Figure 2:
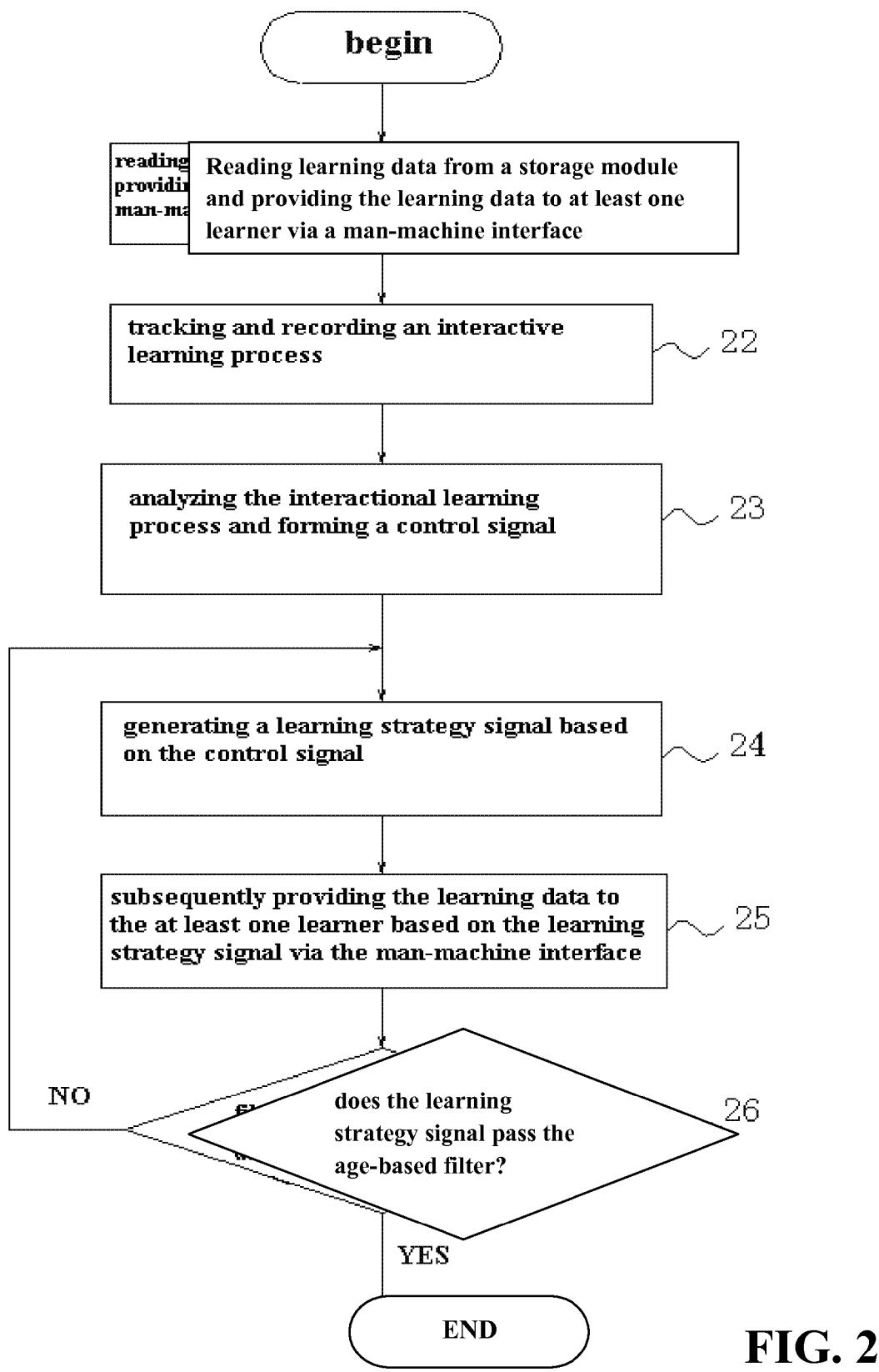
FIG. 2 is a flow chart of the computer-aided learning method with adaptive optimization of the present invention.

As shown in FIG. 2, a method for computer-aided learning with adaptive optimization, the method comprising: reading learning data from a storage module; providing the learning data to at least one learner via a man-machine interface; tracking and recording an interactive learning process, the interactive learning process representing a plurality of interactions between the at least one learner and the man-machine interface; analyzing the interactional learning process and forming a control signal; generating a learning strategy signal based on the control signal, the learning strategy signal being at least one of: a recommended daily learning duration for the at least one learner, a recommended time allocation for learning a new item, a recommended time allocation for reviewing an old item, a recommended number of new items to be learned in a day, a recommended time interval between two review sessions, and a recommended number of old items to be reviewed in a day; and subsequently providing the learning data to the at least one learner based on the learning strategy signal via the man-machine interface. The computer-aided learning method with adaptive optimization further comprising filtering the learning strategy signal based on an age associated with the learning strategy signal.

The involved mathematical principles when optimizing the learning strategy generation module 405 are as follows.

Mathematically, let $\vec{X}=(x_1, x_2, \ldots, x_n)$ denote the vector of variable parameters such as the raw rate of learning new items, how many times each learned item is reviewed, and a recommended time interval between two review sessions, let O denote the oracle module, which is a function that returns a vector $\vec{Y}=(y_0, y_1, y_2, \ldots, y_n)$ for each input vector, namely, $$(y_0, y_1, y_2, \ldots, y_n) = O(x_1, x_2, \ldots, x_n), \quad (1)$$

where $y_0$ is the value of a suitable objective function, such as the learning efficiency, that is, more specifically, the number of daily learned items being nearly permanently retained in memory after the specified number of reviews, and $y_i = \partial y_0 / \partial x_i, \forall i \in [1, n]$ are the partial derivatives of the objective function against the learning strategy signal, so that $\vec{Y}'=(y_1, y_2, \ldots, y_n)$ is the gradient of objective function, or when convex analysis is applicable, $\vec{Y}'$ may be more generally defined as the subdifferential of the objective function. In plain English, the oracle model is a black-box whose inner structure and working are not known or visible, which nonetheless responds to every query with a legitimate input vector $\vec{X}$ and returns an answer $\vec{Y}=O(\vec{X})$. It is worth noting that each oracle model is specific to an individual learner in conjunction with the CAL (computer-aided learning) software being used. Namely, the oracle model is personalized.

The total number $M_{tot}$ of items to be learned is assumed sufficiently large in comparison with the number of new items that can be learned in a relatively short period of time, for example, the number $M_1$ of items that may be freshly learned each day, namely, the raw learning rate, so that the finiteness of $M_{tot}$ has a negligible effect on the optimal learning strategy. A initial integer m is chosen for the total number of spaced reviews, which shall be adjusted iteratively, together with other variable parameters, to optimize the true learning rate (learning rate in short), or called the learning efficiency, as the product of $M_1$ and the learning efficacy, which is defined as the percentage of the $M_1$ learned items that are truly retained in memory. The embedded modeler should determine an average value of $M_1$ according to the recommended daily learning duration, and the recommended time allocation for learning a new item, the recommended time allocation for reviewing an old item, as well as the number of old items to be reviewed in a day m, so that the learner could finish learning and reviewing (1+m) $M_1$ items daily on average. For each item, the last review(s) is (are) actually a test to assess the learning efficacy p. With a raw learning rate $M_1$, the learner would truly learn on average $pM_1$ items daily, while the remaining $(1-p) M_1$ items may have to be put back to the not-yet-learned and undergo another turn of learning and reviewing, or be collected into a different group of items and subjected to a different reviewing schedule. In the former mathematically simple case, let $C_0$ and $C_i$, $\forall i \in [1,m]$ be the average amounts of time spent to learn an item the first time and to review a learned item for the i time, $C_{tot}$ be the average amounts of time available each day for the computer-aided learning, then a constraint of time consumption reads, $$M_1 C_0 + M_1 \sum_{i=1}^{m} C_i \leq C_{tot} \quad (2)$$

The efficacy p is estimated from the statistics of a large number of learned items, so that the learning efficiency $y_o = pM_1$, that is, the true learning rate, is obtained by statistical estimation. With the integer m fixed, the parameters $C_0$ and $\{C_i\}_{i=1}^{m}$ statistically estimated, the temporal spacing $\vec{T} = (T_1, T_2, \ldots T_m)$ need to be varied from an initial setting $\vec{T}_0 = (T_{10}, T_{20}, \ldots, T_{m0})$ and optimized in order to maximize the learning efficiency $y_o$, where $i \in [1,m]$, $T_i$ is the time delay between the i-1 time and the i time repetitions of reviewing. To that end, for each $i \in [1,m]$, the embedded modeler does the following: 1) picking more than one different values around $T_{i0}$, for example, two values $T_{i-}$ and $T_{i+}$ such that $T_{i-} < T_{i0} < T_{i+}$, and keeping the rest temporal spacing unchanged, so to form correspondingly more than one reviewing schedules that differ only by the value of $T_i$, then 2) assigning learned items randomly to the reviewing schedules, and collecting the statistics of item recalling after the m times review to obtain different learning efficacy values, finally 3) comparing the different efficacy values to infer the partial derivative $\partial(pM_1)/\partial T_i$. All the m partial derivative together constitute an estimate of the gradient $\vec{Y}$'.

Either intentionally arranged diversification or naturally inevitable randomization (due to slips or advances of schedule under fluctuations of the actual learning time committed daily) of the reviewing schedule generates J vector derivations $d\vec{T}_j = \{(T_{1j}, T_{2j}, \ldots, T_{mj})\}_{j=1}^{J}$ from the initial vector of spacing $\vec{T}_o$, for J learned items, each of which is labeled by either $\epsilon_j = 1$ for being well retained in memory or $\epsilon_j = 0$ for not yet being acquired by the learner, according to the result of the test for assessing the learning efficacy. The linear space spanned by the vector needs to be exactly m. If the effects of learning and reviewing as well as the final testing of each item are assumed statistically independent, and $\epsilon_j$ for each $j \in [1,J]$ is assumed to be a Bernoulli-distributed random variable with success probability $p(T_0 + dT_j)$, then the gradient of the learning efficacy $\vec{\partial} p = (\partial_1 p, \partial_2 p, \ldots, \partial_m p) = (\partial p/\partial T_1, \partial p/\partial T_2, \ldots, \partial p/\partial T_m)$ may be estimated using the maximum likelihood method, that is, $$\begin{aligned}\vec{\partial} p &= (\partial_1 p, \partial_2 p, \ldots, \partial_m \partial) \\ &= \operatorname{argmax}\left\{\prod_{j:\varepsilon_j=1}\left(p_0 + \sum_{i=1}^{m}\partial_i p dT_{ij}\right)\prod_{j:\varepsilon_j=0}\left(1 - p_0 - \sum_{i=1}^{m}\partial_i p dT_{ij}\right)\right\} \\ &= \operatorname{argmax}\left\{\begin{array}{l}\sum_{j:\varepsilon_j=1}\log\left(p_0 + \sum_{i=1}^{m}\partial_i p dT_{ij}\right) + \\ \sum_{j:\varepsilon_j=0}\log\left(1 - p_0 - \sum_{i=1}^{m}\partial_i p dT_{ij}\right)\end{array}\right\} \\ &= \operatorname{argmax}\left\{\begin{array}{l}\sum_{j:\varepsilon_j=1}\log\left(1 + \frac{1}{p_0}\sum_{i=1}^{m}\partial_i p dT_{ij}\right) + \\ \sum_{j:\varepsilon_j=0}\log\left(1 - \frac{1}{1-p_0}\sum_{i=1}^{m}\partial_i p dT_{ij}\right)\end{array}\right\} \\ &= \operatorname{argmax}\left\{\begin{array}{l}\sum_{i=1}^{m}\left(\sum_{j:\varepsilon_j=1}\frac{dT_{ij}}{p_0} - \sum_{j:\varepsilon_j=0}\frac{dT_{ij}}{1-p_0}\right)\partial_i p + \\ O\left[\sum_{i=1}^{m}\sum_{j=1}^{J}T_{ij}^2(\partial_i p)^2\right]\end{array}\right\}\end{aligned} \quad (3)$$

subject to the following constrains, $$0 \leq p_0 + \sum_{i=1}^{m} \partial_i p dT_{ij} \leq 1, \quad (4)$$

$$\forall j \in [1, J]$$

If the second and the higher-order terms in the last line of equation (3) may be neglected, then the gradient $\vec{\partial} p$ is obtained by solving the following problem of linear programming (LP), $$\operatorname{maximize} \sum_{i=1}^{m}\left(\sum_{j:\varepsilon_j=1}\frac{dT_{ij}}{p_0} - \sum_{j:\varepsilon_j=0}\frac{dT_{ij}}{1-p_0}\right)\partial_i p, \quad (5)$$

$$\text{subject to } \sum_{i=1}^{m}(-dT_{ij})\partial_i p \leq p_0, \forall j \in [1, J], \quad (6)$$

$$\text{and } \sum_{i=1}^{m} dT_{ij}\partial_i p \leq 1 - p_0, \forall j \in [1, J]. \quad (7)$$

It has been seen that an embedded modeler may turn a learner-computer system into an oracle model of itself, by synthesizing and sending probe signals and statistically processing the collected learning data. Such oracle model provides gradient data of an objective function of under changes of controlled parameters, which is often the only necessary information for iterative optimization algorithms to drive a learning strategy moving toward ad eventually converging to the optimal setting. It is worth nothing that not only the learning data accumulate in time and their statistics have a growing ensemble size, but also the CAL system may evolve in time, therefore both the oracle model (in terms of the gradient values it returns) and the optimization algorithms are necessarily adaptive and evolve in time. A window function with a finite width of time delay may be used to filter the recorded data, in order to emphasize the near history that may better approximate the present and the near-future states of the system.

There are many iterative optimization algorithms that work with an adaptive oracle model providing gradient information, which makes the optimization algorithms also adaptive in nature. In one preferred embodiment, the learning efficiency, namely, the true learning rate, is to be maximized by adjusting the number of reviews m and the recommended time interval between two review sessions $\{T_i\}_{i=1}^m$. This is equivalent to minimizing the total learning time, given a fixed number of items to be learned. Firstly, the time cost constants $C_0$ and the time resource bound $C_{tot}$ need to be statistically estimated and adaptively updated. An outer loop of an optimization routine may enumerate all admissible values of m and pick the best setting. Then inside the loop, for each fixed value of m, the other time cost constants $\{C_i\}_{i=1}^m$ need to be estimated, such that the constraint on the raw learning rate $M_1$ as in equation (2) become definitive. In fact, $M_1$ should saturate the upper bound in order to maximize the learning efficiency, that is, $$M_1 = \frac{C_{tot}}{C_0 + \sum_{i=1}^{m} C_i} \quad (8)$$

Consequently, an inner loop needs just to maximize the learning efficacy $p(T_1, T_2, \ldots T_m)$, subject to the following obvious constraints, $$T_i > 0, \forall\, i \in [1, m], \quad (9)$$

$$\sum_{i=1}^{m} T_i \leq T_{max}, \quad (10)$$

Wherein $T_{max}$ is a predetermined upper bound.

The conjugate gradient methods may be the best suitable for global optimizations, especially when the objective function to be maximized, here the learning efficacy $p(T_1, T_2, \ldots T_m)$, is a linear or concave function in the convex body defined by the constraints (9) and (10), that is, the optimization problem is convex programming, in which case a conjugate gradient algorithm is guaranteed to converge to the optimal solution within m iteration steps of line search and search direction update, each of which involves a gradient calculation and a few objective function evaluations. There are also other efficient (such as the interior-point) algorithms suitable for such convex problems. In order to further reduce the number of oracle calls, at any current location $\vec{T}_0$, the objective function and its gradient may be evaluated once and assumed to stay constant within a reasonably extended neighborhood $\vec{T}_0 + \Delta \vec{T}$ with $\Delta \vec{T} \in \Pi_{i=1}^m (\Delta T_{i-}, \Delta T_{i+})$, so that the objective function may be approximated by a linear form $p(\vec{T}) = p(\vec{T}_0) + \vec{\partial} p \cdot (\vec{T} - \vec{T}_0), \forall \vec{T} \in \vec{T}_0 + \Delta \vec{T}$, and the following problem of linear programming, $$\text{maximize } p(\vec{T}_0) + \vec{\partial} p \cdot (\vec{T} - \vec{T}_0) \quad (11)$$

$$\text{subject to } T_i > \max(0, T_{0i} + \Delta T_{i-}), \forall\, i \in [1, m] \quad (12)$$

$$\text{and } T_i \leq T_{0i} + \Delta T_{i+}, \forall\, i \in [1, m] \quad (13)$$

$$\text{and } \sum_{i=1}^{m} T_i \leq T_{max} \quad (14)$$

can be efficiently solved to locate the optimal point within the neighborhood, to which the current location $\vec{T}_0$ is updated, then the function and its gradient may be evaluated again, and a new neighborhood of the updated current location, which partially overlaps the previous neighborhood, is assigned and the similar problem of linear programming is solved. Having such LP routines repeated multiple times, one gets a series of open set neighborhoods connected into a "pipe" that converges to the globally optimal solution, when the global optimization problem is convex. Such method may be called LP continuation.

However, when the global optimization problem is not convex, neither conjugate gradient nor LP continuation is guaranteed to converge to the global optimum. Indeed, there is unlikely any general algorithm that solves a general non-linear optimization problem efficiently, as a general, non-convex optimization problem can be NP-hard, where NP stands for non-deterministically polynomial time. Nevertheless, the conjugate gradient and LP continuation methods may still be employed to locate suboptimal solutions, and the methods of simulated annealing may help the optimizer to escape from traps of local optima. Besides, many local search heuristics perform not so bad on many instances of NP-hard problems that are actually not so hard on average.

In one practical algorithm that is not guaranteed to yield the global optimum, but simple to implement, and ensured to converge fast to a decent suboptimal solution, there is an outer loop enumerating the number of reviews m as above, but within which, the temporal spacing $T_1, T_2, \ldots T_m$ are optimized individually and sequentially. For each $i \in [1, m]$, when $T_i$ is to be optimized, the first i−1 spacing $\{T_k\}_{k=1}^i$ must all have already been optimized, and a few different values of $T_i$ a are chosen to probe the learner-computer system, then the testing results at the i+1 review after a spacing $T_0$, i+1 are collected and statistically summarized to infer the corresponding values of the provisional learning efficacy at the time of the i+1 review, which guide the search of the best value of $T_i$. The final review at time $\Sigma_{i=1}^m T_i$ after the very first learning is actually an embedded test for estimating overall learning efficacy.

It is believed that the computer-aided learning system and method of the present invention and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A computer system for providing computer-aided learning with adaptive optimization, comprising:

a storage module configured for storing learning data;
a man-machine interface configured for providing the learning data to at least one learner;
an information collection module configured for tracking and recording an interactive learning process, the interactive learning process representing a plurality of interactions between the at least one learner and the man-machine interface;
a learning process analysis module configured for receiving the interactional learning process provided by the information collection module, the learning process analysis module further configured for analyzing the interactional learning process and forming a control signal, the control signal including an assessed learning efficacy specific to the at least one learner; and
a learning strategy generation module configured for receiving the control signal from the learning process analysis module, the learning strategy generation module further configured for generating a learning strategy signal specifically for the at least one learner at least partially based on the learning efficacy of the at least one learner, the learning strategy signal indicating at least one of: a recommended daily learning duration for the at least one learner, a recommended time allocation for learning a new item, a recommended time allocation for reviewing an old item, a recommended number of new items to be learned in a day, a recommended number of review sessions, a recommended time interval between two review sessions, and a recommended number of old items to be reviewed in a day;
wherein the man-machine interface is configured to provide the learning data to the at least one learner based on the learning strategy signal,
wherein the learning efficacy specific to the at least one learner is determined by maximizing the learning efficacy for learning the recommended number of new items to be learned in a day, the learning efficacy being maximized by adjusting the recommended time interval between two review sessions, subject to:

$$T_i > 0, \sum_{i=1}^{m} T_i \leq T_{max}, \forall\, i \in [1, m]$$

wherein m is the recommended number of review sessions, $$\{T_i\}_{i=1}^{m}$$

is the recommended time interval between two review sessions and $T_{max}$ is a predetermined upper bound.

2. The computer system as claimed in claim 1, further comprising:
a filtering module configured for filtering learning strategy signals generated by the learning strategy generation module, where the learning strategy signals are filtered based on an age associated with each learning strategy signal.

3. A method for providing computer-aided learning with adaptive optimization, the method comprising:
reading learning data from a storage module;
providing the learning data to at least one learner via a man-machine interface;
tracking and recording an interactive learning process, the interactive learning process representing a plurality of interactions between the at least one learner and the man-machine interface;
analyzing the interactional learning process and forming a control signal, the control signal including an assessed learning efficacy specific to the at least one learner;
generating a learning strategy signal specifically for the at least one learner at least partially based on the learning efficacy of the at least one learner, the learning strategy signal indicating at least one of: a recommended daily learning duration for the at least one learner, a recommended time allocation for learning a new item, a recommended time allocation for reviewing an old item, a recommended number of new items to be learned in a day, a recommended number of review sessions, a recommended time interval between two review sessions, and a recommended number of old items to be reviewed in a day; and
subsequently providing the learning data to the at least one learner based on the learning strategy signal via the man-machine interface,
wherein the learning efficacy specific to the at least one learner is determined by maximizing the learning efficacy for learning the recommended number of new items to be learned in a day, the learning efficacy being maximized by adjusting the recommended time interval between two review sessions, subject to:

$$T_i > 0, \sum_{i=1}^{m} T_i \leq T_{max}, \forall\, i \in [1, m]$$

wherein m is the recommended number of review sessions, $$\{T_i\}_{i=1}^{m}$$

is the recommended time interval between two review sessions and $T_{max}$ is a predetermined upper bound.

4. The method as claimed in claim 3, further comprising:
filtering the learning strategy signal based on an age associated with the learning strategy signal.

5. The computer system as claimed in claim 1, wherein the learning strategy signal indicates: a recommended daily learning duration for the at least one learner, a recommended time allocation for learning a new item, a recommended time allocation for reviewing an old item, a recommended number of new items to be learned in a day, a recommended time interval between two review sessions, and a recommended number of old items to be reviewed in a day.

6. The method as claimed in claim 3, wherein the learning strategy signal indicates: a recommended daily learning duration for the at least one learner, a recommended time allocation for learning a new item, a recommended time allocation for reviewing an old item, a recommended number of new items to be learned in a day, a recommended time interval between two review sessions, and a recommended number of old items to be reviewed in a day.

* * * * *